United States Patent
De La Cruz et al.

(10) Patent No.: US 9,762,871 B2
(45) Date of Patent: *Sep. 12, 2017

(54) CAMERA ASSISTED TWO DIMENSIONAL KEYSTONE CORRECTION

(71) Applicant: Texas Instruments Incorporated, Dallas, TX (US)

(72) Inventors: Jaime Rene De La Cruz, Plano, TX (US); Jeffrey Mathew Kempf, Allen, TX (US); Ramzansaheb Nadaf, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,977

(22) Filed: Dec. 11, 2015

(65) Prior Publication Data

US 2016/0173841 A1 Jun. 16, 2016

Related U.S. Application Data

(60) Provisional application No. 62/090,583, filed on Dec. 11, 2014.

(51) Int. Cl.
*H04N 9/31* (2006.01)
*G03B 21/14* (2006.01)

(52) U.S. Cl.
CPC ......... *H04N 9/3185* (2013.01); *G03B 21/147* (2013.01); *H04N 9/3194* (2013.01)

(58) Field of Classification Search
CPC ...... G03B 21/28; G03B 21/53; G03B 21/147; H04N 9/3185; H04N 9/3194
See application file for complete search history.

(56) References Cited

U.S. PATENT DOCUMENTS

| | | | |
|---|---|---|---|
| 7,379,619 B2 | 5/2008 | Ikeda | |
| 2002/0154138 A1* | 10/2002 | Wada | ............... G09G 3/002 345/600 |
| 2003/0117413 A1* | 6/2003 | Matsuda | ............ G09G 5/04 345/589 |
| 2006/0203207 A1 | 9/2006 | Ikeda | |
| 2006/0221259 A1* | 10/2006 | Miyazawa | ........ H04N 9/3155 348/790 |

(Continued)

*Primary Examiner* — Sultan Chowdhury
(74) *Attorney, Agent, or Firm* — Michael A. Davis, Jr.; Charles A. Brill; Frank D. Cimino

(57) ABSTRACT

A system and method for facilitating keystone correction in a given model of projector having an attached camera is disclosed. System calibration determines intrinsic and extrinsic parameters of the projector and camera; then control points are identified within a three-dimensional space in front of a screen. The three-dimensional space defines a throw range and maximum pitch and yaw offsets for the projector/screen combination. At each control point, the projector projects a group of structured light elements on the screen and the camera captures an image of the projected pattern. These images are used to create three-dimensional look-up tables that identify a relationship between each image and at least one of (i) pitch and yaw offset angles for the respective control point and (ii) a focal length and a principal point for the respective control point. The given model projectors use the tables in effectuating keystone correction.

11 Claims, 11 Drawing Sheets

(56) References Cited

U.S. PATENT DOCUMENTS

2010/0045942 A1* 2/2010 Furui ................... H04N 9/3194
  353/69
2010/0103385 A1* 4/2010 Kubota ................ G03B 21/147
  353/70

* cited by examiner

CAMERA ASSISTED TWO DIMENSIONAL KEYSTONE CORRECTION

CLAIM OF PRIORITY AND RELATED PATENT APPLICATIONS

This nonprovisional application claims priority based upon the following prior United States provisional patent application(s): (i) "CAMERA-ASSISTED TWO-DIMENSIONAL KEYSTONE CORRECTION," Application No. 62/090,583, filed Dec. 11, 2014, in the name(s) of Jaime Rene De La Cruz, Jeffrey M. Kempf, and Ramzansaheb Nadaf, which is hereby incorporated by reference in its entirety.

FIELD OF THE DISCLOSURE

Disclosed embodiments relate generally to the field of image projection systems. More particularly, and not by way of any limitation, the present disclosure is directed to keystone correction for a projection system using an attached camera.

BACKGROUND

When a projector is set up so that the optical axis is not perpendicular to the projection screen, keystone distortion occurs. This distortion can be one-dimensional (i.e., vertical or horizontal offset) or two-dimensional (i.e., vertical and horizontal offset). Keystone distortion occurs when the projected image plane is not parallel to the screen plane and the optical axis is not perpendicular to the screen plane. Although several keystone correction techniques are available for projector systems, various shortcoming and deficiencies continue to persist.

SUMMARY

The present patent application discloses methods and devices for facilitating automatic two-dimensional keystone correction of a projection system, e.g., using the pitch and yaw offset angles of a projector to a screen. The offset angles are determined with the assistance of a digital camera, using either a statistical method or a statistical-geometric method in an example embodiment. By projecting structured light patterns using camera-projector calibration techniques, as well as a novel statistical calibration technique, the projection screen pose (i.e., the orientation relative to the projection system's optical axis) can be determined and keystone distortion corrected using an angle-based user model described herein below. Embodiments of the present patent disclosure are directed to the following four components:
  System calibration;
  Structured-light pattern processing;
  Offset angles (relative pose) determination; and
  Providing the offset angles to an Integrated Circuit (IC) for correction of two-dimensional distortion using the angle-based user model.

In one aspect, an embodiment of a method for facilitating keystone correction in a projector is disclosed. The method includes performing system calibration of a given model of projector that has a camera attached thereto in a known relationship, the system calibration determining intrinsic and extrinsic parameters of the given model of projector and the camera; identifying, within a three-dimensional space in front of a screen, a plurality of control points, wherein the three-dimensional space defines a throw range of the given model of projector and further defines a maximum pitch offset and a maximum yaw offset of the given model of projector from the plane of the screen; for each of the plurality of control points, placing the given model of projector at the control point, projecting a group of structured light elements on the screen using the given model of projector, and capturing an image of the projected pattern with the camera; using the captured images to create a plurality of three-dimensional look-up tables (LUTs) that identify a relationship between an image captured at a given control point and at least one of (i) pitch and yaw offset angles associated with the given control point and (ii) a focal length and a principal point associated with the given control point; and storing the LUTs in a memory in the given model of projectors for use in effectuating keystone correction.

In another aspect, an embodiment of a method for effecting keystone correction on a projector is disclosed. The method includes using a given model of projector that has a camera attached thereto in a known relationship to project a group of structured light elements on a screen; capturing an image of the projected group of structured light elements using the camera; determining a shape of the group of structured light elements as captured by the camera; and searching for a statistical match to the shape in a plurality of three-dimensional look-up tables (LUTs) and using the statistical match to determine a pitch offset angle and a yaw offset angle between the given model of projector and the screen for effectuating keystone correction.

In yet another aspect, an embodiment of an integrated circuit (IC) for effecting keystone correction on a projector is disclosed. The IC includes circuitry to perform a method that includes using a given model of projector having a camera attached thereto in a known relationship to project a group of structured light elements on a screen; capturing an image of the projected group of structured light elements using the camera; determining a shape of the group of structured light elements as captured by the camera; and searching for a statistical match to the shape in a plurality of three-dimensional look-up tables (LUTs) and using the statistical match to determine a pitch offset angle and a yaw offset angle between the given model of projector and the screen to effectuate keystone correction.

Advantages of the disclosed embodiments may include one or more of the following:
  The methodology is not dependent on the resolution of the camera, so low cost cameras can be used;
  The methodology does not require the projection screen to have identifiable features, such as a sub-screen, horizontal lines, vertical lines, or other features;
  The focal length of the projector does not need to be known, hence feedback sensors on the optics are not necessary; and
  Existing microprocessor and memory in the projector can be used to handle calculations.
Further advantages of the embodiments may be appreciated in view of the following.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 20:
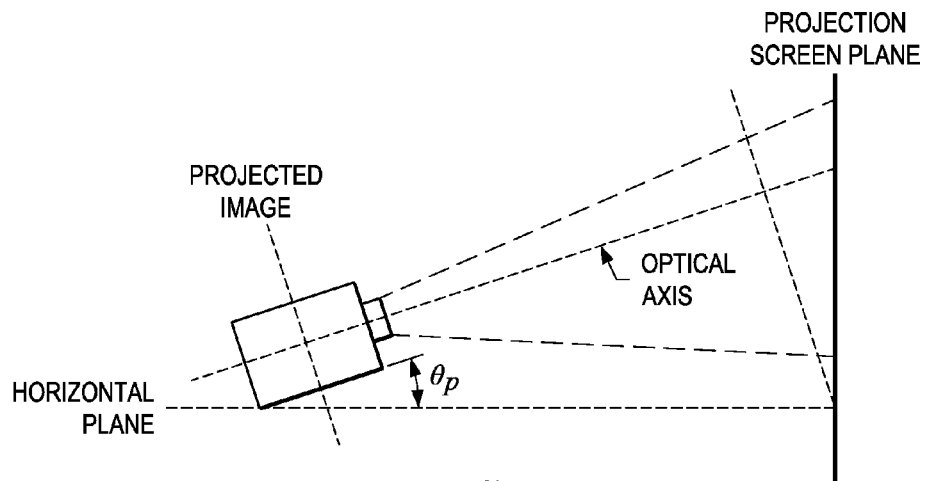
FIG. 20 depicts a projector tilted vertically by an angle $\theta_p$ with respect to the horizontal plane, causing vertical keystone distortion.
Figure 21:
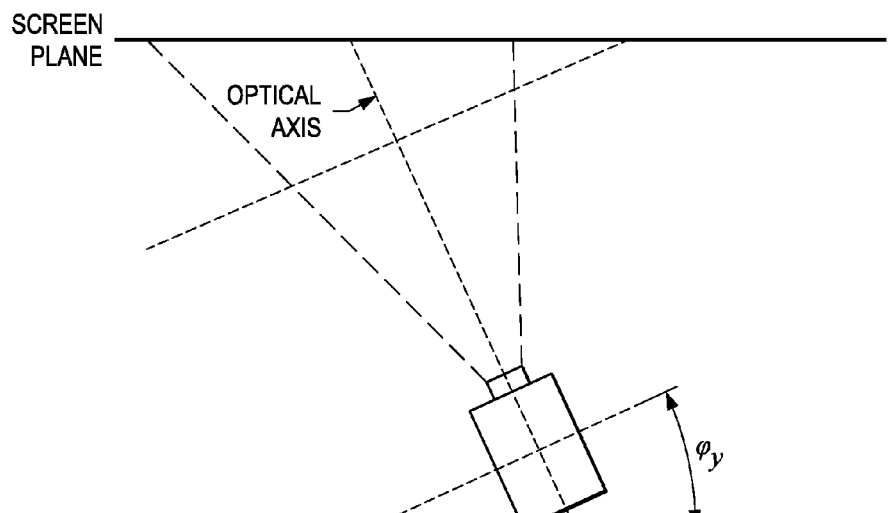
FIG. 21 depicts a projector tilted horizontally by an angle $\phi_y$ with respect to the plane of the screen, causing horizontal keystone distortion.
Figure 22:
FIG. 22 depicts a quadrilateral as projected from a projector and the resulting keystone distortion when the projector has both a vertical and a horizontal offset angle.

Referring now to the drawings and more particularly to FIGS. 20-22, vertical keystone distortion occurs when the projector is tilted vertically by an angle $\theta_p$ with respect to the horizontal plane, as shown in FIG. 20, while horizontal keystone distortion occurs when the projector is tilted horizontally by an angle $\phi_y$, as shown in FIG. 21. In the present application, vertical offset angle is referred as the pitch offset angle and the horizontal offset angle is referred as the yaw offset angle. When a projector is set up with both pitch and yaw offset angles, two-dimensional keystone distortion causes the projected input image to be deformed into an irregular trapezoid from the point of view of a user perpendicular to the screen, as shown in FIG. 22, where the rectangle on the left represents the projected image and the irregular trapezoid on the right represents the distorted image as seen by the viewer.

Currently, several Application-Specific Integrated Circuits (ASICs) are available to correct for two-dimensional keystone distortion. For these ASICs, two user models are available: angle-based adjustment and manual four-corner adjustment. In the angle-based model, the user enters the approximate pitch and yaw angles as well as the projection system optical parameters such as the throw ratio, vertical offset and image resolution. With this information and after a few transformations, the four corners of the quadrilateral (i.e., the keystone corrected image) are calculated. The four calculated corners are then passed to the ASIC's two-dimensional correction engine so that the input image/video can be properly scaled before being projected. The keystone corrected image is constructed in such a way that when projected onto a screen, a rectangular image with the appropriate aspect ratio can be perceived by a viewer in a position perpendicular to the projection screen.

In the manual-four corners adjusted model, each one of the corners of the keystone corrected image is adjusted by a user perpendicular to the screen until a rectangular image is produced, with no pitch or yaw information required. In one example of this model, an image is projected and a user manually points to the actual four corners of the screen to which the image is to be adjusted. The ASIC then makes an adjustment to fit the image. This user model is difficult to use when the screen on which the image is projected is very large or the offset angle is acute. In both the angle-based adjustment model and the manual four-corner adjustment model, several iterations may be required to obtain an acceptable image. This may represent a problem when using the angle-based user model, where both pitch and yaw angles must be known before correcting for keystone distortion.

Figure 1:
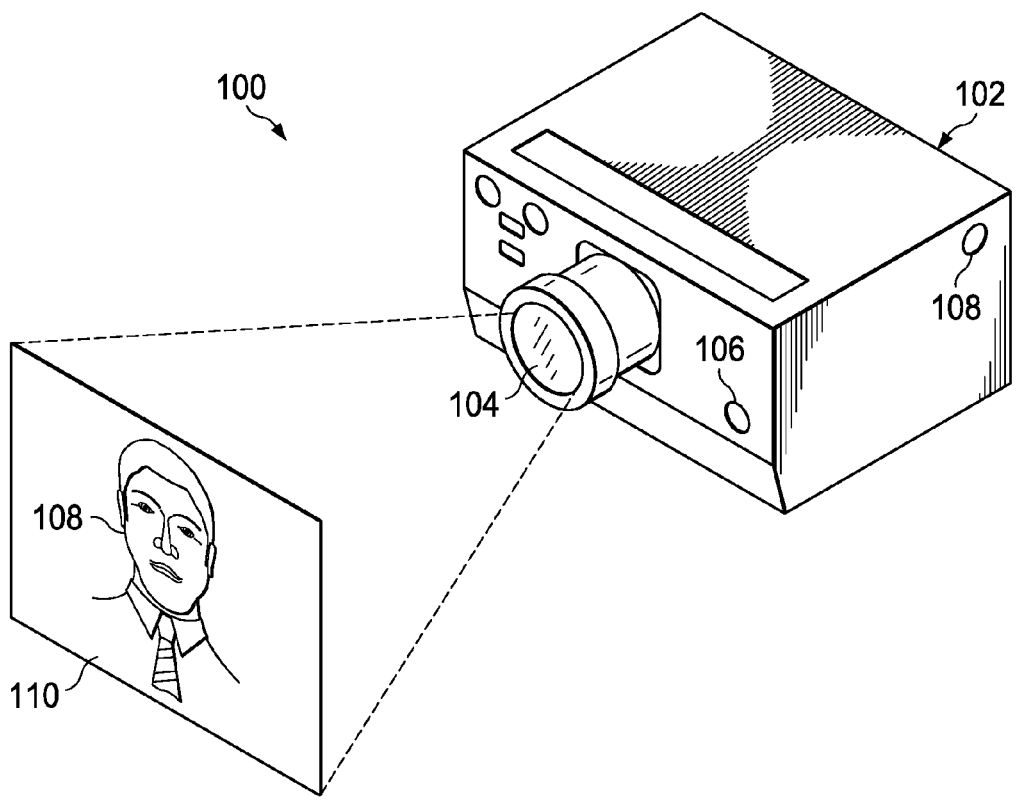
FIG. 1 depicts an example of a projector having a camera attached thereto in a known relationship according to an embodiment of the disclosure.

Turning to FIG. 1, an optical projection system 100 according to an embodiment of the disclosure is shown. Optical projection system 100 includes a projector 102 for projecting an image 108 onto a screen 110 through a projection lens 104. The image 108 may also be a slideshow presentation or videos. Also included in this system 100 is a camera or image capture device 106, such as a charge-coupled device (CCD) camera or a complementary metal oxide semiconductor (CMOS) image sensor. In at least one embodiment, the image capture device 106 is embedded within projector 102. In at least one embodiment, image capture device 106 is a CCD camera 106, which is integrated into the projector 102 for capturing a projected image 108 in a front projection system 100. The image capture device 106 appears as a small lens or a pinhole imaging through a small hole in the projector 102, but outside the circumference of the existing projection lens 104 (as illustrated in the figure). In the remainder of this disclosure, reference to a camera will be understood to encompass any type of image capture device. For a given model of projector, the relationship between the projector and the camera is fixed, allowing the manufacturer to perform calibration of the system once and use the received information to create Look-Up Tables (LUTs) that can provide pitch and yaw offset angles for an automatic keystone correction process. These LUTs are then stored in an IC for use by any projector of the same model.

In at least one embodiment a user input means, such as a button 108 or other input device is used to initiate an automatic keystone correction process that includes the use of the disclosed determination of pitch and yaw offset angles. The input device can be located on the projector itself, as shown, or can be on an external control device (not specifically shown). For a projector that is permanently installed, e.g., in a conference room or auditorium, the automatic keystone correction process is performed once, at the time of installation. For movable projectors having the disclosed improvements, the keystone correction process is performed each time the projector is moved. In at least one embodiment, the projector contains an accelerometer; the keystone correction process is performed whenever the projector has been moved since its last use. In at least one embodiment, projector 102 includes an accelerometer and whenever the projector determines that the projector has been moved since a last use, the keystone correction process is performed automatically.

As noted previously, the disclosed method and devices for keystone correction fall into the four overall elements of system calibration, structured-light pattern processing, offset angles calculations, and providing the offset angles to an IC for correction of two-dimensional distortion. The following discussion is organized into these four broad elements, with the discussion breaking the noted elements into smaller elements.

System Calibration

Figure 2:
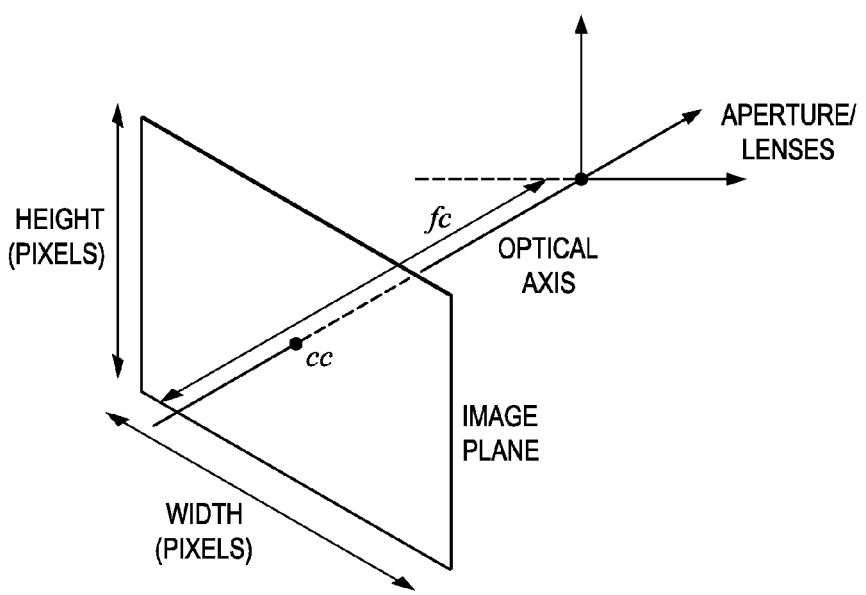
FIG. 2 depicts key parameters used in the pinhole camera model used in discussing the optical calculations made for both the camera and the projector.

For system calibration, both camera/projector calibration and statistical calibration search tables are obtained. The geometric portion of the proposed method requires the use of structured light patterns and is based on the pinhole camera model. FIG. 2 depicts some of the parameters used in the pinhole camera model, which requires that the following parameters be determined: focal length (fc), principal point (cc), pixel skewness ($\alpha_C$) and a distortion coefficients vector ($k_C$). Two sets of parameters are required, one set for the camera and one set for the projector, which is modeled as an inverse camera. Image plane 202 has a known height and width in pixels. Image plane 202 in the camera is the plane on which a two-dimensional representation of the imaged three-dimensional scene is captured, e.g., the plane of the film, CCD or CMOS image sensor. In the projector, this plane contains the image being projected. The viewing direction of the camera or projector defines the optical axis 204, which passes through the aperture 206 or lens of the device. Focal length fc is the distance between image plane 202 and aperture 206, while principal point cc lies at the intersection of the optical axis 204 and the image plane 202.

Figure 3:
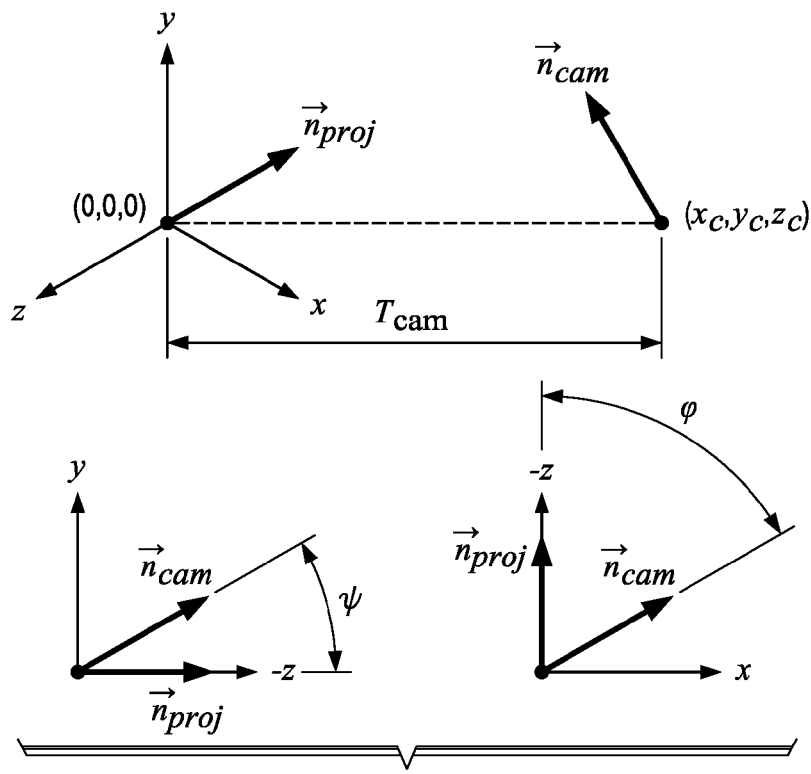
FIG. 3 depicts various extrinsic parameters of the projector and camera system.

The parameters described above are called the intrinsic camera/projector parameters and provide information about the camera/projector's internal structure. As noted above, a set of parameters must be calculated for the camera and another set for the projector. The camera/projector extrinsic parameters describe the relative position and orientation of the camera with respect to the projector's optical axis. The two camera/projector system extrinsic parameters are the translation vector (i.e., the distance from projector to camera in mm) and the rotation matrix of the camera with respect to the projector, which are illustrated in FIG. 3. As seen in this figure and discussed throughout the rest of the application, it is assumed that the projector is centered at the origin (0,0,0) of the xyz axis and that the optical axis, i.e., the normal vector $\vec{n}_{cam}$ of the projector points towards the −z axis. The camera normal vector is located at a distance equal to the translation vector from the origin and has a different orientation. The translation vector $T_{cam}$ is the position of the camera center ($x_C, y_C, z_C$) in relation to the origin and is expressed in millimeters. The rotation matrix, $R_{cam}$, accounts for the relative pitch, yaw and roll of the camera normal vector $\vec{n}_{cam}$ with respect to the projector normal vector (i.e. the optical axis) $\vec{n}_{proj}$. Both intrinsic and extrinsic parameters can be obtained using known iterative camera calibration methods.

Figure 4:
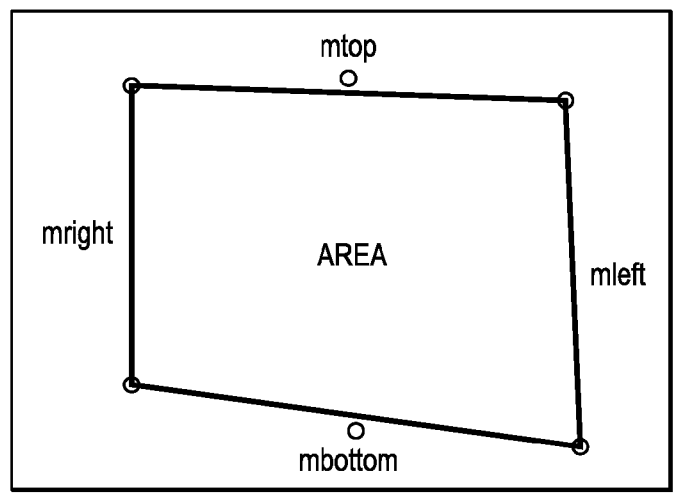
FIG. 4 depicts an imaginary quadrilateral formed by joining some of the structured light pattern elements in the camera-captured image according to an embodiment of the disclosure.

The statistical part of the proposed method requires the creation of lookup tables in order to construct a statistical population based on the possible shapes of the structured light pattern features as seen by the camera. The statistical population encompasses the dynamic throw range of the projector, i.e., the range of supported throw distances for a particular projection system, which is divided into a number of slices at different distances from the projector. In this method, a multi-element structured light pattern is projected onto a screen and captured with the camera for different pitch and yaw pairs (i.e., control points in two-dimensional solution space). At each control point the top, bottom, left and right slopes of an imaginary quadrilateral formed by joining individual structured light pattern elements, as well as the relative area of the quadrilateral with respect to the camera frame area, are recorded and stored. An example of a structured light pattern and the imaginary quadrilateral formed therein is shown in FIG. 4. The stored control points with associated slopes and area form a set of five sparse data tables with shape and size information.

Figure 5:
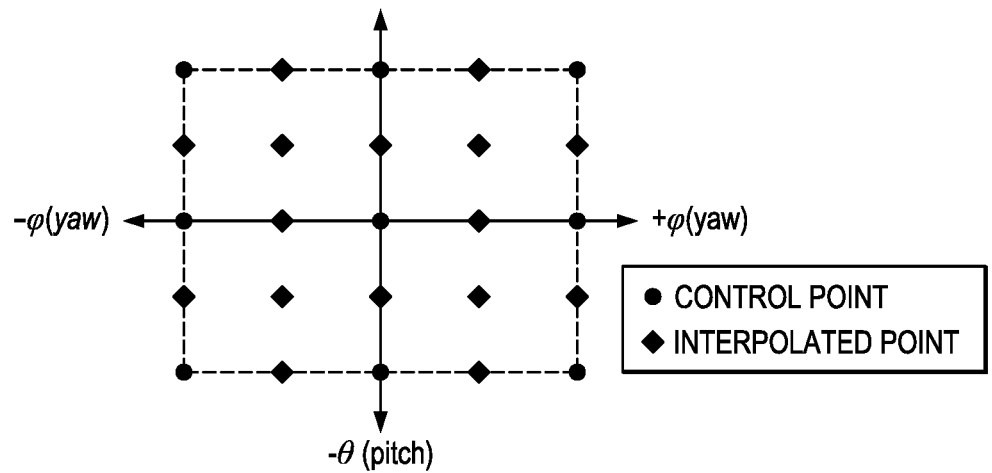
FIG. 5 depicts an example of a set of control points for which data is collected and interpolated points lying there between according to an embodiment of the disclosure.

A fully populated set of tables is required to create a reliable statistical population of shape and size data. However, it is impractical to capture images for every single combination of offset angles. This problem is solved by using bilinear interpolation to populate the data points between the control points of the two-dimensional solution space. Control points are determined by identifying regions of acceptable linearity. An example of the pitch and yaw pairs at which the images can be captured in a single slice are illustrated in FIG. 5. In this figure, circles illustrate the measured control points, while diamonds illustrate the interpolated points. The solution space should cover both negative and positive pitch and yaw angles, such that all of the possible shapes and sizes of the quadrilateral for all pitch/yaw combinations are stored in the lookup tables. In at least one embodiment, the control points at which images are taken is extended from the three-by-three embodiment shown to a five-by-five set of control points.

Figure 6:
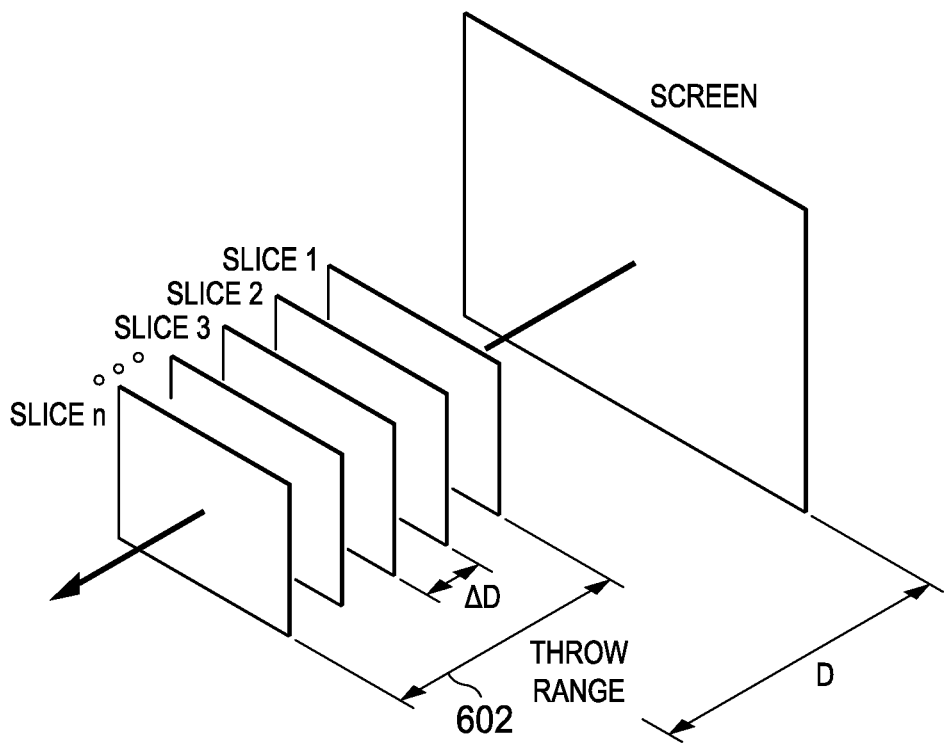
FIG. 6 depicts an example of slicing the dynamic throw range for the creation of a set of lookup tables associated with each slice according to an embodiment of the disclosure.

A set of lookup tables is created and populated at various nodes or slices in the dynamic throw range of the projector, as illustrated in FIG. 6. As seen in this figure, the Throw Range 602 encompasses the range of distances D that the projector is able to "throw" the projected image. Throw range 602 is divided into segments or slices spaced a distance AD apart. This allows the creation of a very complete statistical population. Each one of slices is created by positioning the projector at a respective distance, D, from the screen and then capturing images of the projected structured light pattern at different positions corresponding to the known pitch and yaw angles of each one of the control points of the two-dimensional solution space shown in FIG. 5. The rest of the points in the two-dimensional solution space are populated using interpolated data, as mentioned above. Calibration data, including camera-projector calibration and statistical calibration using the captured images, are generally performed by the manufacturer. Thereafter, the calibration data is available for storage in the memory of those projectors or projection systems produced using the same design. Provision of this data enables a projector to perform automatic determinations of the offset angles of the projector and to provide these offset angles to existing programs that correct the associated distortion.

Structured Light Pattern Processing

In this section, structured light patterns are projected, captured by the camera and processed. As noted earlier, a user who is installing a fixed projector will only need to perform the process once. When processing for the innovative method is included in a movable projector, the process can be performed each time the projector is set up in a different location. Structured light patterns are used to establish a one-to-one pixel correlation between two cameras or between a camera and a projector. In this method, however, a one-to-one pixel correlation is not necessary; moreover, only the centroids of the elements in the projected and camera-captured images need to be correlated. This greatly reduces the amount of memory and the computational complexity required to establish correspondence between the camera and projector images.

Structured light patterns are used in this method because they allow for an easy and efficient correlation between projected and camera-captured images. In the disclosed method, sparse-element structured light patterns (i.e., sparse elements in a contrasting background) are favored over other, more complex, structured light patterns such as binary, sinusoidal, phase-shifting, De-Brujin etc. Although the aforementioned complex patterns can provide more spatial resolution and noise robustness, sparse-element patterns can be processed in very fast manner, thus increasing the execution speed of the operation. Additionally, based on user preference, two structured light pattern modes are available for use in this method: single-pattern and inverse-patterns. In the single-pattern mode, one sparse-element structured light pattern, e.g., white elements over a black background, is projected and captured. In this mode, the elements in the projected pattern are expected to be considerably brighter than the background, so they can be properly detected by the camera. In the inverse-pattern mode, two sparse-element structured light patterns, white elements over a black background and its inverse, black elements over a white background, are projected and captured sequentially. Background noise and specular reflections from the projection screen can be effectively minimized by calculating the differences between the two sequential images. Although the inverse-pattern mode represents the most robust option in terms of noise minimization, it requires storing and processing two images in the IC. In contrast, the single-pattern mode requires storing and processing a single image in the IC. Therefore, the inverse-pattern mode trades-off noise robustness/ambient correction for execution speed with the single-pattern mode.

As mentioned above, in the disclosed method, correspondence between the projected image and the captured image must be established for only a few points (i.e. 1-to-1 correspondence is not needed). Structured light patterns with sparse elements (e.g., Gaussians, circles, lines, among others) provide a fast and efficient way to establish this correspondence. Additionally, given the expected light ambient conditions for a projector, dark to medium illuminated, the bright elements in the patterns can be easily identified and noise minimized. In the method, the positions of the elements in the projected structured light pattern are chosen in such a way that most of the projected image space is covered. The reason for this is to recover as much spatial information as possible from the projection screen and the camera captured image. Additionally, it is desirable that a regular polygon (e.g. a rectangle) can be formed by joining some of the sparse structured light pattern elements by imaginary lines in the camera captured image. This polygon is used when determining changes in the camera-captured image size by the statistical portion of this method.

The position (x, y) of the elements' centroids in the camera captured image are determined by using a single-pass connected component analysis (single-pass CCA) algorithm. The single-pass CCA is a clustering algorithm that searches for connected components with intensities above a predetermined threshold value, thus discarding low intensity noise. The clusters of connected elements are assigned local IDs or tags and their centers of mass (or centroids) and relative areas are calculated. After the entire image has been analyzed and all of the detected connected component clusters identified and tagged, the connected components are sorted in descending order based on their relative area. For a camera-captured image in which N elements are expected, only the first N elements in area-based descending order are considered; the remaining connected element clusters, in case they exist, are considered noise and discarded. It is assumed that the inverse structured light pattern elements will be the largest and brightest elements in the camera captured image and that smaller bright elements can be considered noise and, therefore be discarded.

Although there are several other algorithms and techniques that can detect connected components and blobs in images, the vast majority of them require analyzing the image at least twice and a considerable amount of memory and processing power. The single-pass CCA algorithm used here requires retrieving the camera-captured image from the embedded ASIC memory just once, analyzing the image line by line. This greatly improves the execution speed without sacrificing robustness.

Figure 7:
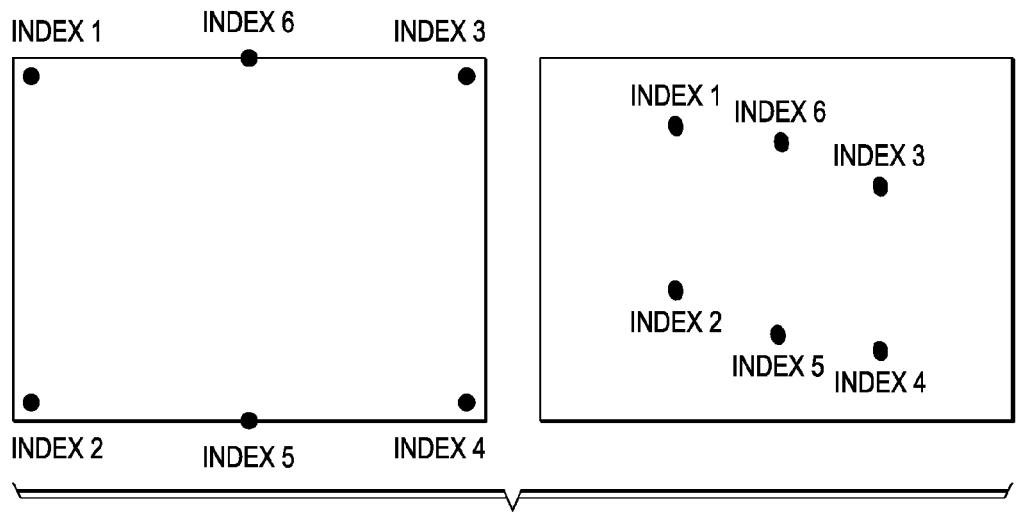
FIG. 7 depicts a structured light pattern as projected from the projector and as captured with the camera according to an embodiment of the disclosure.

Each one of the N structured light pattern elements in the projected image is assigned an index number, ranging from 0 to N−1, and their center-of-mass/centroids is stored in memory. It must be noted that the projected image is not analyzed by the single-pass CCA algorithm, since it is assumed that the position of the connected-component clusters are known. In the same way as with projected image, each one of the connected-component clusters must be assigned an index number, 0 to N−1, and their corresponding centroids stored in memory. However, the indices of the camera-captured centroids must be matched to their corresponding centroids in the projected image. This is a very important step in the method, because the correspondence between the projected and captured images is established by a one-to-one centroids relationship. For other, more complex, structured light patterns, such as binary patterns, index matching is performed by assigning binary codes to each one of the pixels in both the projected and camera-captured images. For the sparse inverse structured light patterns used in this method, the index matching is done geometrically, that is, the camera-captured image frame is divided in quadrants, such that each one of the centroids occupies a single quadrant; this process is repeated in the projected image. Each one of the centroids/quadrants in the camera-captured image is matched to their corresponding quadrant/centroids in the projected image. It is assumed that the relative position of the camera-captured centroids will be similar, albeit distorted to some degree, to the relative position of the centroids in the projected image. FIG. 7 demonstrates the centroids index matching between a projected structured light pattern on the left (six Gaussian functions in this particular case) and the corresponding detected centroids on the camera captured image on the right.

The position (x, y) in pixels, with the origin being the top left corner for both images, are stored in two vector arrays for future use in the method. The structured light pattern processing can be summarized by the following:

Project the structured light pattern image;
Capture the projected image with the camera;
Detect the centroids in the camera-captured image (single-pass CCA);
Do index matching;
Create projector points' vector; and
Create camera points' vector.
Offset Angles (Relative Pose) Calculations The purpose of this section is to determine the pose of the projection screen with respect to the projector, more specifically the center of projection. Based on the projection system properties and user preferences, there are two possible methods for determining the offset angles (pitch and yaw):

Using only the lookup tables (statistical); and
Using the lookup table in conjunction with the camera-projector calibration data (statistical-geometric).

Figure 8A:
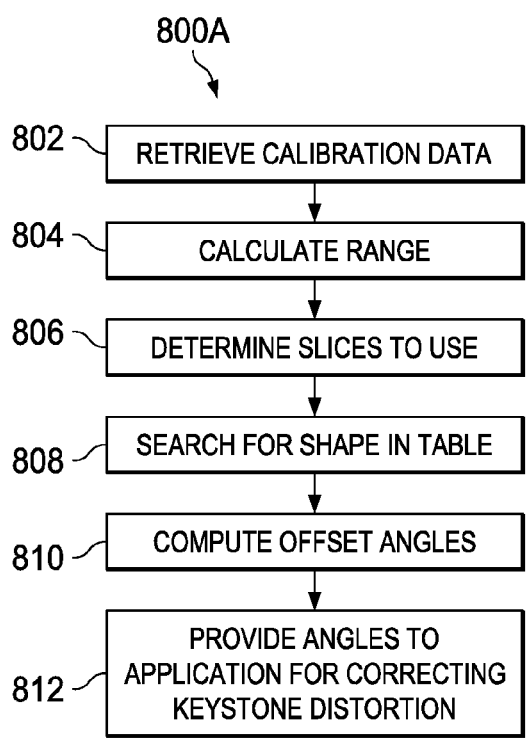
FIG. 8A depicts a flowchart for determining the offset angles according to an embodiment of the disclosure.
Figure 8B:
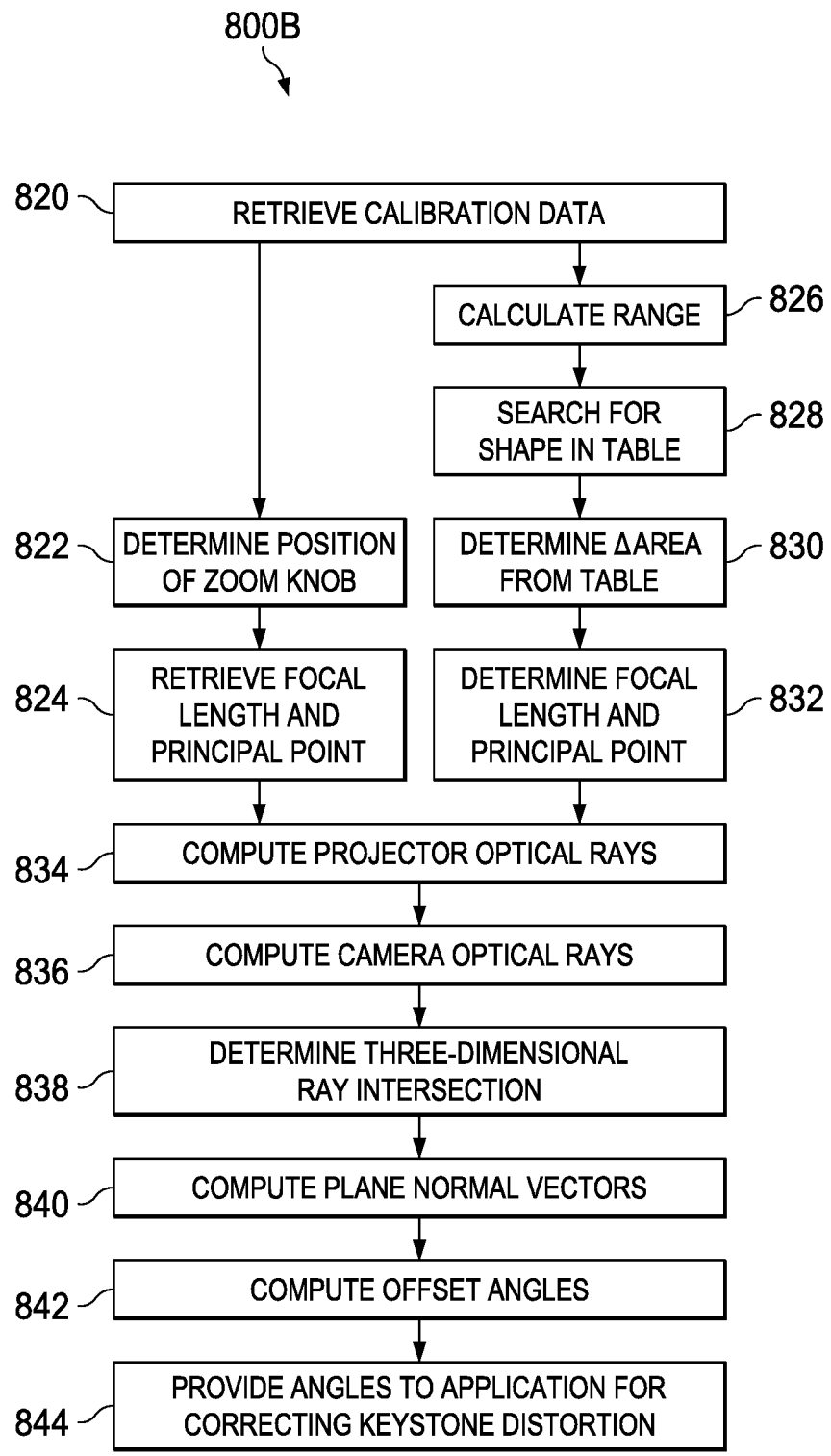
FIG. 8B depicts a flowchart for determining the offset angles according to an embodiment of the disclosure.

The flowcharts of FIGS. 8A and 8B depict the two possible ways to determine the offset angles. These methods are labeled the statistical method, depicted in FIG. 8A, and the statistical-geometric method, depicted in FIG. 8B.

Statistical Method:

Looking first at the statistical method 800A, this method primarily uses the lookup tables created during system calibration. When method 800A begins, the projector retrieves (802) the calibration data that was stored in the projector by the manufacturer. Then the projector calculates (804) the range, that is, the approximate distance between the projector and the screen. This is accomplished by calculating the intersection point in three-dimensional space between two imaginary rays of light that are determined using a certain centroid of the projected/captured image. The first ray can be defined using the known pixel location in the projector's image plane corresponding to the certain centroid and second ray can be determined using the known pixel location in the camera's image plane corresponding to the certain centroid. The point of intersection between these two rays corresponds to the approximate distance between the projection screen and the projector. For a more detailed explanation of how the approximate range is determined, reference is made to the sub-section below that discusses finding the intersection of rays.

Figure 9:
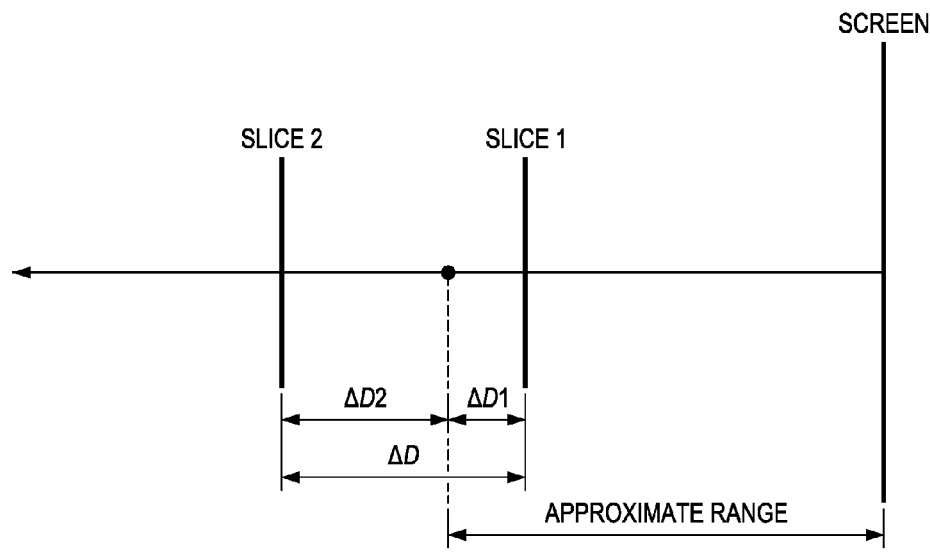
FIG. 9 depicts selection of the two closest slices to the approximate range for use in determining the offset angles according to an embodiment of the disclosure.
Figure 10:
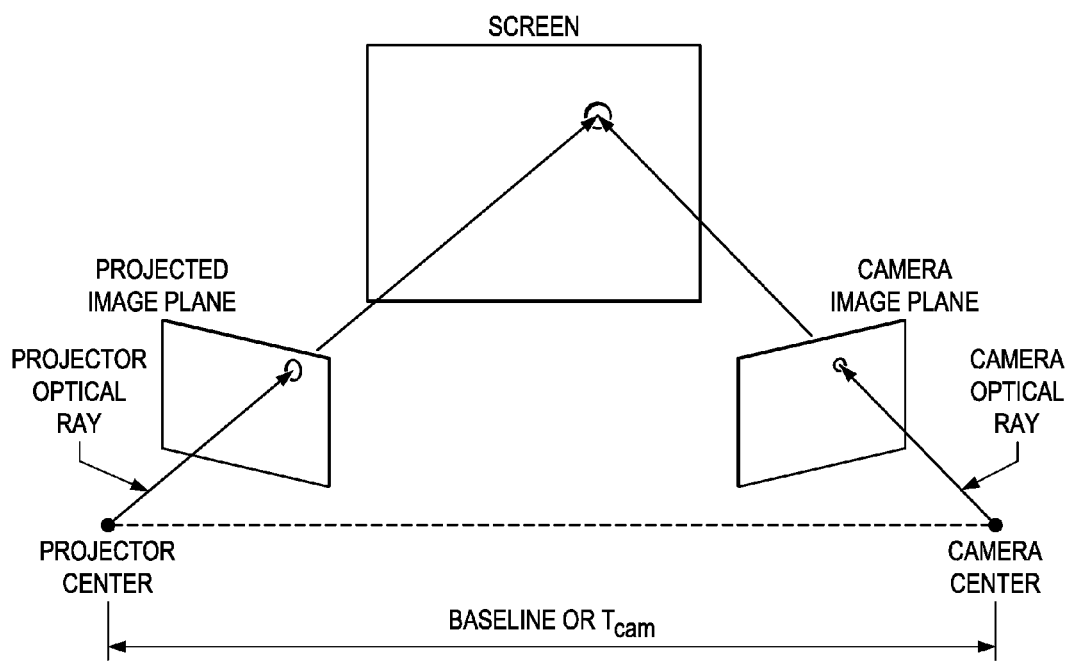
FIG. 10 depicts the intersection of the camera and projector optical rays at the projection screen.

The purpose of the range calculation is to determine which set of lookup tables need to be used. As previously described, lookup tables are created for a number of different distances or slices. Each one of the slices has a set of lookup tables containing data pertaining to the shape (slopes) and size (relative area) of the imaginary quadrilateral in the camera-captured structured light pattern. Once the approximate range is determined, the two slices lying on either side of the approximate range (Slice1 and Slice2) are determined (806). An example of this selection of slices is illustrated in FIG. 9. In this figure, the distance between the projector and the screen has been determined to be a distance shown by Approximate Range 602. Slice1 and Slice2 have been selected, with the distance associated with Slice2 greater than the distances associated with Slice1. The distance AD between Slice1 and Slice2 is sub-divided into two distances: ΔD1, which is the distance between Slice1 and the projector and ΔD2, which is the distance between Slice2 and the projector.

Each slice consists of five lookup tables with interpolated data, namely top slope (mtop), bottom slope (mbot), left inverse slope (mlft) and right inverse slope (mrgt), relative area and an additional parameter named Δarea. The relative area lookup tables and the area parameter are not used in this section, but will be used later. Each table has a size equal to rows*cols, where rows is total number of data points in the vertical direction and cols is the total number of data points in the horizontal direction. For the example of control points and interpolated points shown in FIG. 5, for instance, each slice contains five rows and five columns. At this point, the position of the camera-captured image centroids is retrieved from memory and the slopes (top, bottom, left and right) of the camera-captured quadrilateral are computed and stored in a vector array:

$$M_{cam} = \begin{bmatrix} mtop_{cam} \\ mbot_{cam} \\ mlft_{cam} \\ mrgt_{cam} \end{bmatrix} \quad (\text{Eq. 1})$$

Returning to FIG. 8A, the projector searches (808) the lookup tables for the camera-captured shape, that is, the entries of this vector are compared to each one of the entries in the four lookup tables for mtop, mbot, mlft and mrgt; at each entry, the absolute difference between the camera-captured image and the stored image is computed. The purpose is to find the pair of lookup table indices (ii, jj, where ii is the column and jj is the row within the slice) for which the mean of the absolute differences is at the minimum possible value. The search is defined as follows:

Find $(ii,jj)$ such that $S_{diff}$=mean $(M_{diff})$ is at the minimum value possible, where:

$$M_{diff} = abs(M_{cam} - M_{ii,jj}) \quad (Eq. 2)$$

$$M_{diff} = \begin{bmatrix} abs(mtop_{cam} - mtop_{ii,jj}) \\ abs(mbot_{cam} - mbot_{ii,jj}) \\ abs(mlft_{cam} - mlft_{ii,jj}) \\ abs(mrgt_{cam} - mrgt_{ii,jj}) \end{bmatrix} \quad (Eq. 3)$$

Once the indices (ii, jj) are found, it can be said, with statistical confidence that the shape of the camera-captured quadrilateral is most similar to the shape of the camera-captured quadrilateral corresponding to the (ii,jj) entry in the lookup tables. When the distance D of the projector from the screen falls between two slices, two pairs of indices need to be found: $(ii_1,jj_1)$ and $(ii_2,jj_2)$, where the slice containing $ii_2,jj_2$ is further from the screen that the slice containing $ii_1,jj_1$. Assuming that the lookup tables were constructed using control points with known pitch and yaw offset angles, the approximate Pitch and Yaw angles, corresponding to the current projector position and distance, can be computed (810) as follows:

$$\theta_1(pitch) = jj_1 * Step_{pitch} + \theta_{min} \quad (Eq. 4)$$

$$\phi_1(yaw) = ii_1 * Step_{yaw} + \phi_{min} \quad (Eq. 5)$$

$$\theta_2(pitch) = jj_2 * Step_{pitch} + \theta_{min} \quad (Eq. 6)$$

$$\phi_2(yaw) = ii_2 * Step_{yaw} + \phi_{min} \quad (Eq. 7)$$

where $Step_{pitch}$ and $Step_{yaw}$ are the sampling step sizes of the lookup tables and $\theta_{min}$ and $\phi_{min}$ are the minimum pitch and yaw angles used in the lookup table control points. The final pitch and yaw angles are calculated as the weighted sum of the angles found from slices 1 and 2:

$$w_1 = \frac{\Delta D_2}{\Delta D} \quad (Eq. 8)$$

$$w_2 = \frac{\Delta D_1}{\Delta D} \quad (Eq. 9)$$

$$\theta(pitch) = \frac{w_1 \theta_1 + w_2 \theta_2}{w_1 w_2} \quad (Eq. 10)$$

$$\varphi(yaw) = \frac{w_1 \varphi_1 + w_2 \varphi}{w_2 w_2} \quad (Eq. 11)$$

where $w_1$ and $w_2$ are the calculated weights. Once the pitch and yaw angles are computed, the projector provides (812) the pitch and yaw angles to an application that corrects the keystone distortion using the provided angles.

Statistical-Geometric Method:

In the statistical-geometric method, which is illustrated in FIG. 8B, the offset angles are determined by first calculating the real three-dimensional position of each one of the centroids of the structured light pattern elements as they are projected on the projection screen and then calculating the normal vector of the plane in which all of the pattern elements lie. This plane is the projection screen. By calculating the angles between the projector's optical axis and the plane normal vector, the relative pose (pitch and yaw) of the screen with respect to the projector can be accurately determined and keystone distortion corrected.

In making the calculations for the statistical-geometric method, the following information is used:

Assume that the projector is located at the origin (0, 0, 0) of a Cartesian coordinate system. This point is the center of projection or the projector's center.

The camera then is located at a known distance from the projector's origin, represented by the translation vector $T_{cam}$, described earlier. The translation point describes the camera center.

There is a set of optical rays originating at the projector's center, passing through the centroids of each one of the projected structured light pattern elements and extending into infinity.

There is a set of optical rays originating at the camera center, passing through the centroids of each one of the camera-captured structured light pattern elements and extending into infinity.

Each one of the rays from the projected and camera captured rays will intersect exactly at the centroids of the structured light pattern elements in the projection screen.

Since the real baseline (in mm, in inches, etc.) is known, then the real position of each one of the centroids in the projection screen, with the projection center as the origin, can be determined.

The normal vector of the plane (in this case, the projection screen) can be calculated and the effective offset angles determined.

The statistical-geometric method 800B is implemented as follows. The projector retrieves (820) the calibration data that was previously stored in the projector by the manufacturer. The projector then needs to obtain the projector's focal length and principal point. Both the focal length and principal point depend on the position of the optical zoom control knob/handle of the projector. That is, there is a nominal pair of focal length and principal point values when the projected image is not zoomed-in. When the projected image is zoomed in by changing the position of the zoom control knob/handle, the projected image will increase in size, i.e., the nominal focal length was decreased. This means that the focal length dynamic range can be bounded by two values, minimum and maximum, corresponding to the focal length when the image is not zoomed-in and the focal length when the image is completely zoomed-in. The values of the effective principal point will vary with optical zoom as well. Those skilled in the art will realize that when the wrong focal length and principal point values are used in the calculations, the obtained offset angles will be wrong too. It is, therefore, imperative to have a way of determining the projector's effective focal length and principal point.

In this method two options are available to obtain the effective focal length of the projector. The first option depends on the addition of an electrical sensor located in the optical zoom control knob that is capable of determining relative position indices (e.g. 0 when the knob is at the position that generates the smallest projected image and n when the knob is at the position for which the largest projected image is generated, for n+1 total sensor positions). When this method is implemented, the manufacturer will have performed the camera calibration procedure above for every sensor position and stored the resulting values in projector memory. Then when the user initiates automatic keystone correction, the projector determines (822) the position of the zoom control knob, determines that the sensor is at index position i, and retrieves (824) the focal length and principal point values corresponding to sensor position i from memory and uses these values in the calculations.

If the specific implementation of the projector does not use a position sensor, the method determines the effective focal length statistically, i.e., the method calculates (826) the approximate distance between the projector and the projection screen (range) and searches (828) in the look up table for the appropriate table entry indices. The search is performed in the same way as in the statistical method described above, with just one difference: once the indices ($ii_1, jj_1$) and ($ii_2, jj_2$) are determined, instead of calculating the pair of offset angles, the search looks at the relative area lookup tables and uses these to determine (830) $\Delta AREA$ from the table as explained below.

Two relative areas are obtained: a first area corresponding to entry ($ii_1, jj_1$) in the area lookup table from Slice1 and a second area corresponding to entry ($ii_2, jj_2$) in the area lookup table from Slice2. The area of the camera-captured quadrilateral is then calculated as a percentage of the total area (pixels$^2$) of the camera frame.

During the calibration stage an additional parameter is calculated: the $\Delta A_{nominal}$ parameter. This parameter accounts for the change of the relative area of the camera-captured quadrilateral when the image is zoomed in or out with the respect to the nominal (from calibration) area. The value of $\Delta A_{nominal}$ is represented as a percentage increase and this percentage increase is constant, i.e., for every distance and offset angle, this value remains unchanged. For a given distance and angle:

$$\Delta A_{nominal} = \text{abs}(\text{Area}_{zoom\text{-}in} - \text{Area}_{nominal}) \quad \text{(Eq. 12)}$$

This fact means that although the nominal area values will change as distance and/or angles change, the difference remains constant. This property permits association between the two possible values of the focal length and principal point values (i.e. one value that produces the smallest image on the screen and the other value that produces the largest image on the screen) and bounds the problem; that is, determines the effective focal length and the effective principal point.

Assuming that the camera-projector calibration was performed with the zoom knob at a position in which the smallest image (largest focal length) was produced, the area lookup tables will be populated with the expected nominal. Once the indices are found the expected interpolated area is calculated as follows:

$$AI_{exp} = \frac{A_1 w_1 + A_2 w_2}{w_1 + w_2} \quad \text{(Eq. 13)}$$

Where $AI_{exp}$ is the relative interpolated expected area, $A_1$ is the area corresponding to the ($ii_1, jj_1$) entry in the Area lookup table from Slice1 and $A_2$ is the area corresponding to the ($ii_2, jj_2$) entry in the Area lookup table from Slice2. The parameters $w_1$ and $w_2$ are the weights defined in equations 8 and 9. The change in area, that is, the difference between the interpolated expected area and the actual area $A_{quad}$ of the camera-captured quadrilateral is then calculated as follows:

$$A_{delta} = A_{quad} - AI_{exp} \quad \text{(Eq. 14)}$$

$$A_{delta\_delta} = \frac{A_{delta}}{\Delta A_{nominal}} \quad \text{(Eq. 15)}$$

Since two different focal length values (minimum and maximum) are associated with two different images sizes (largest and smallest), it can be said that:

$$\Delta fc = fc_{max} - fc_{min} \quad \text{(Eq. 16)}$$

The value $A_{delta\_delta}$ is bounded from 0 to 1; therefore the effective focal length is bounded from $fc_{max}$ to $fc_{min}$. The effective focal length is then determined using polynomial interpolation. The interpolation polynomial is defined as a function of the focal length range $$f_r = \frac{A_{delta\_delta}}{\Delta fc},$$

for a degree n, as follows:

$$fc = a_n f_r^n a_{n-1} f_r^{n-1} + \ldots + a_0 \quad \text{(Eq. 17)}$$

The coefficients, $a_n$, $a_{n-1}$, ..., $a_0$, are determined by fitting a $n^{th}$ degree polynomial over known focal lengths (obtained from calibration or from a position sensor) points in the projector's focal length dynamic range. In this way the value of the effective focal length can be determined (832) statistically without the necessity of any sort of sensor. The value of fc will be bounded by $fc_{min}$ and $fc_{max}$. The value for the effective principal point can be determined in the same way as in the effective focal length.

Figure 11:
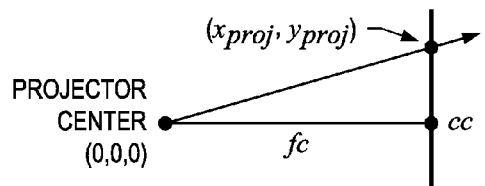
FIG. 11 depicts projector optical rays originating at the projection center.

The projector next computes (834) the equations of the projector' optical rays. An example of one of the projector's optical rays is shown in FIG. 11. As shown, an optical ray originates in the projector's center (0,0,0), passing through the centroids of a structured light element at ($x_{proj}, y_{proj}$) in the projected image plane and then extending to infinity. The orientation of each of the projector optical rays is determined by the position (x, y coordinates in pixels) of the centroid and by the projector's focal length fc and principal point cc.

Each one of the projector's optical rays can be modeled as a three-dimensional vector. The projection lenses will introduce tangential and radial distortion to the projected image, which in this case is the structured light pattern. Therefore, it can be said that the projector optical rays are distorted. This distortion can be described by the following equation:

$$\vec{PR}_{dist} = \begin{bmatrix} \frac{x_{proj} - cc_{proj,x}}{fc_{proj,x}} \\ \frac{y_{proj} - cc_{proj,F}}{fc_{proj,F}} \\ 1 \end{bmatrix} \quad \text{(Eq. 18)}$$

Where $fc_x$ and $fc_y$ are the x and y components of the projector's focal length in pixels and $cc_x$ and $cc_y$ are the x and y components of the principal point. Tangential and radial distortion is then iteratively corrected with the projector distortion coefficient $k_c$. Then, the undistorted rays are described by:

$$\vec{PR}_{undist} = \text{undistort}(\vec{PR}_{dist}) \quad \text{(Eq. 19)}$$

The projector optical rays are simply defined as:

$$\vec{PR} = \frac{\vec{PR}_{undist}}{\|\vec{PR}_{undist}\|} \quad \text{(Eq. 20)}$$

Similarly, the projector computes (836) the camera optical rays. These camera optical rays similarly originate at the camera center, pass through the centroids of each one of the camera-captured structured light pattern elements and extend on to infinity. The formulation of the camera optical rays equations is the same as the projector optical rays: the optical rays are defined as vectors in three-dimensional space, are undistorted and normalized. However there are two main differences in the camera optical rays formulation; first, the intrinsic parameters of the camera should be used when defining the orientation of the optical rays and the distortion coefficients of the camera should be used when correcting for the tangential and radial distortion introduced by the camera optics. Second, to compensate for the relative orientation of the camera with respect to the projector's optical axis, each one of the undistorted and normalized camera optical rays must be rotated (i.e. multiplied by the extrinsic rotation matrix $R_{cam}$). The equations of the camera optical rays are then defined as follows:

$$\vec{CR}_{dist} = \begin{bmatrix} \frac{x_{cam} - cc_{cam,x}}{fc_{cam,x}} \\ \frac{y_{cam} - cc_{cam,y}}{fc_{cam,y}} \\ 1 \end{bmatrix} \quad \text{(Eq. 21)}$$

$$\vec{CR}_{undist} = undistort(\vec{CR}_{dist}) \quad \text{(Eq. 22)}$$

$$\vec{CR} = R_{cam} \cdot \left( \frac{\vec{CR}_{undist}}{\|\vec{CR}_{undist}\|} \right) \quad \text{(Eq. 23)}$$

Figure 12:
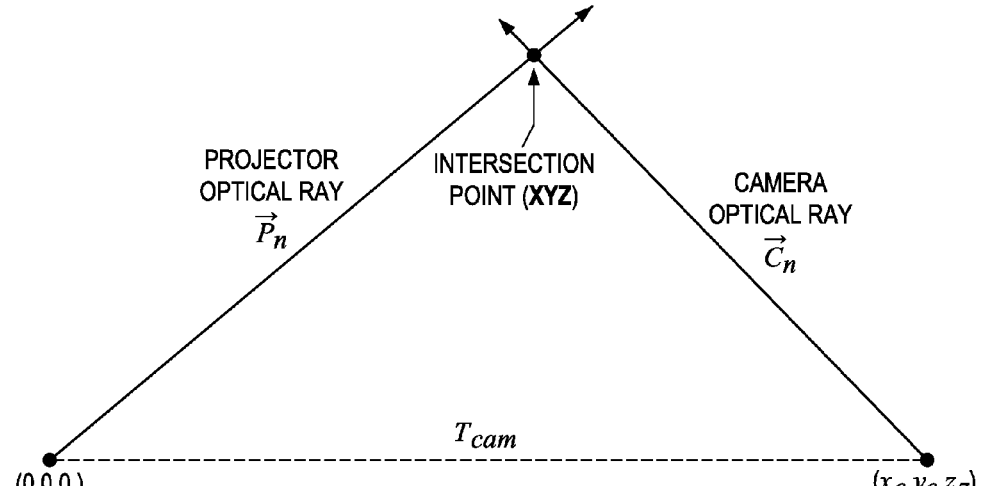
FIG. 12 depicts the intersection point of a pair of projector and camera optical rays.

The method then determines (838) the three-dimensional intersection of the projector's rays and the camera's rays, as illustrated in FIG. 12. For each centroid located at a position (X,Y,Z), the projector optical ray and the camera optical ray will intersect, or due to numerical errors/rounding, pass very close to each other, at the projection screen. For N elements in the structured light patterns, there will be N projector optical rays, N camera optical rays and N intersection points in three-dimensional space.

The translation vector is expressed in mm (or other real distance unit) and represents the real position of the camera with respect to the projector's optical axis. Therefore the XYZ position in mm of each one of the N intersection points can be computed. For an intersection, its XYZ position with respect to the projector's center is computed as follows using directional vector arithmetic, for a projector and camera optical ray pair (in vector form) $\vec{P}_n$ and $\vec{C}_n$:

$$\vec{c}_o = \begin{bmatrix} 0 \\ 0 \\ 0 \end{bmatrix} \quad \text{(Eq. 24)}$$

$$\vec{C}_c = \vec{T}_{cam} = \begin{bmatrix} x_c \\ y_c \\ z_c \end{bmatrix} \quad \text{(Eq. 25)}$$

$$\vec{W}_0 = \vec{P}_c - \vec{C}_c = \begin{bmatrix} -x_c \\ -y_c \\ -z_c \end{bmatrix} \quad \text{(Eq. 26)}$$

$$\begin{aligned} a &= \vec{P}_n \cdot \vec{P}_n \\ b &= \vec{P}_n \cdot \vec{C}_n \\ c &= \vec{C}_n \cdot \vec{C}_n \\ d &= \vec{P}_n \cdot \vec{W}_0 \\ e &= \vec{C}_n \cdot \vec{W}_0 \end{aligned} \quad \text{(Eq. 27)}$$

The closest point $XYZ_n$ (in vector form) between the two rays $\vec{P}_n$ and $\vec{C}_n$ is:

$$sC = \frac{be - cd}{ac + b^2} \quad \text{(Eq. 28)}$$

$$tC = \frac{ae - bd}{ac + b^2} \quad \text{(Eq. 29)}$$

$$\vec{P}_{sC} = \vec{P}_c + sC * \vec{P}_n \quad \text{(Eq. 30)}$$

$$\vec{P}_{tC} = \vec{C}_c + tC * C_n \quad \text{(Eq. 31)}$$

$$\vec{XYZ}_n = \begin{bmatrix} X \\ Y \\ Z \end{bmatrix} = 0.5(\vec{P}_{sC} + \vec{P}_{tC}) \quad \text{(Eq. 32)}$$

This process is repeated for each one of the N optical ray pairs, thus recovering the real (or real world) position of each one of the elements projected onto the screen.

Figure 13:
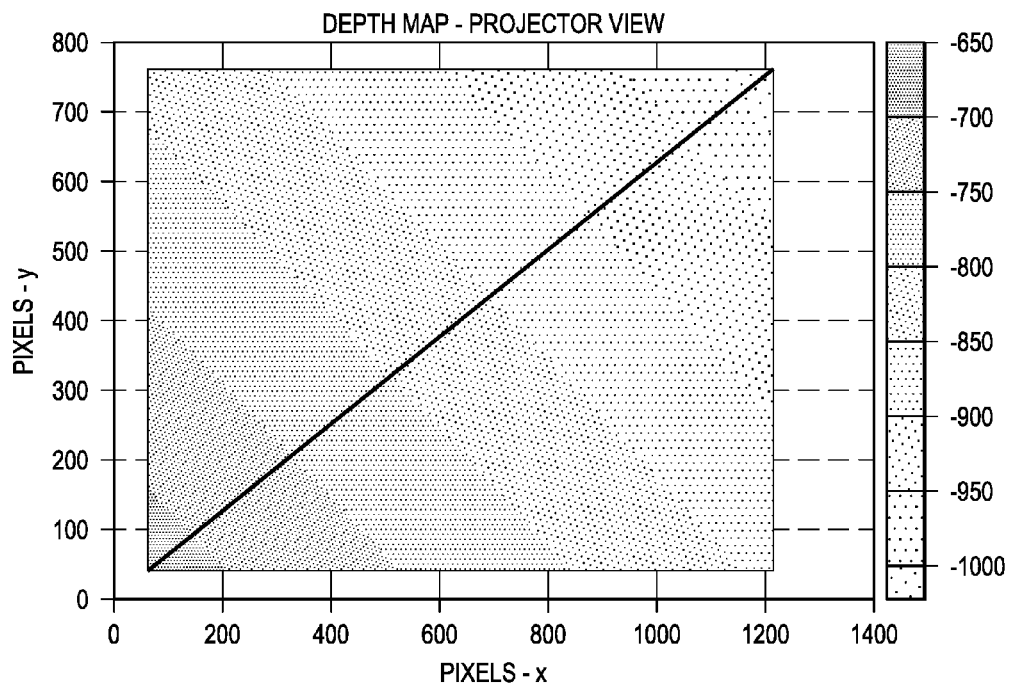
FIG. 13 depicts an example projection screen depth map according to an embodiment of the disclosure.

Once the intersection of all of the N optical ray pairs has been determined, the method computes (840) the normal vector(s) of the plane(s) in which all of the intersection points lie. With the N three-dimensional points recovered in the previous section, a depth map of the projection screen in real three-dimensional coordinates can be constructed from the projectors perspective. An example of a depth map from the projector's perspective is shown in FIG. 13. This example used four points to determine the plane of the screen. The units are millimeters and represent the real distance of the projection screen to the projector. It can be realized that in this example, the projector is offset from the screen in both a vertical and lateral direction. It is assumed that the projection screen will be flat (i.e. a plane in three-dimensional space).

The minimum number of points necessary to accurately determine the normal vector of a plane in three-dimensional space is three, if more than three points are available, the normal vector of the screen plane can be determined by calculating the average of two or more planes or by calculating the best fitting plane using linear regression. Since the position of the projector and camera are also known, an accurate reconstruction of the system (projector, camera and screen) can be obtained from this information, if desired.

In this method, two-dimensional keystone distortion is corrected by using the angle-method user model; therefore the method next computes (842) the angles between the reconstructed plane and the projector's optical axis. These angles will give the pitch and yaw angles necessary to correct for two-dimensional keystone distortion. For N=3 points the normal vector of the plane is calculated below. The equation of a plane in 3D space is:

$$Ax + Bx + Cz = D \quad \text{(Eq. 33)}$$

The coordinates of the three points $P_1$, $P_2$ and $P_3$ are expressed in vector form as:

$$\vec{P} = P_1 = \begin{bmatrix} x_1 \\ y_1 \\ z_1 \end{bmatrix} \quad \text{(Eq. 34)}$$

$$\vec{Q} = P_2 = \begin{bmatrix} x_2 \\ y_2 \\ z_2 \end{bmatrix} \quad \text{(Eq. 35)}$$

-continued $$\vec{R} = P_3 = \begin{bmatrix} x_3 \\ y_3 \\ z_3 \end{bmatrix} \quad \text{(Eq. 36)}$$

With $P_1$ as the origin of this system, directional vectors are defined as follows:

$$\vec{u} = \vec{Q} - \vec{P} \quad \text{(Eq. 37)}$$

$$\vec{v} = \vec{R} - \vec{P} \quad \text{(Eq. 38)}$$

The normal vector of the plane, $\vec{n}_{plane}$, must be perpendicular to both directional vectors, $\vec{u}$ and $\vec{v}$. Therefore, the normal vector of the plane is the cross product of $\vec{u}$ and $\vec{v}$:

$$\vec{n}_{plane} = \vec{u} \times \vec{v} = \begin{bmatrix} n_{plane,x} \\ n_{plane,y} \\ n_{plane,z} \end{bmatrix} \quad \text{(Eq. 39)}$$

The coefficients of the screen plane equations can be also determined from the normal vector (although they are not necessary for future calculations):

$$A = n_{plane,x} \; B = n_{plane,y} \; C = n_{plane,z} \; D = -A(x_1) - B(y_1) - C(z_1) \quad \text{(Eq. 40)}$$

Figure 14:
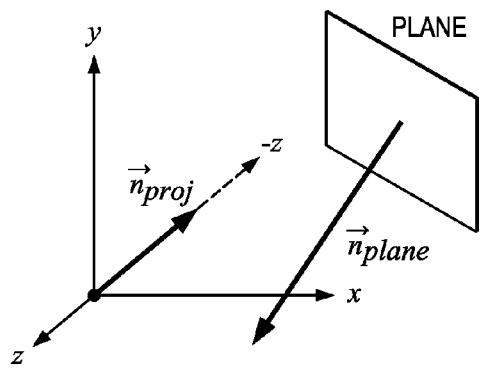
FIG. 14 depicts the normal vectors for the screen and the projector.
Figure 15:
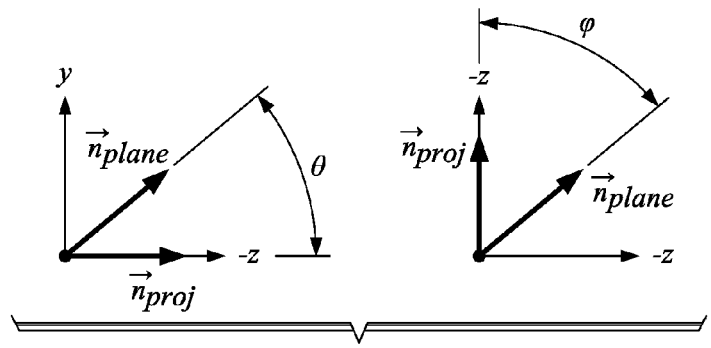
FIG. 15 depicts the angles between the screen's normal vector and the projector's optical axis as they relate to the system's pitch and yaw offset angles according to an embodiment of the disclosure.

The screen's pitch and yaw angles can be determined by calculating the angles between the projector's optical axis and the screen plane's normal vector, seen in FIGS. 14 and 15. The optical axis of the projector can be defined as a vector:

$$\vec{n}_{proj} = \begin{bmatrix} 0 \\ 0 \\ -1 \end{bmatrix} \quad \text{(Eq. 41)}$$

The pitch angle (θ) is computed as follows:

$$\vec{V}_\theta = \begin{bmatrix} 0 \\ n_{plane,y} \\ n_{plane,z} \end{bmatrix} \quad \text{(Eq. 42)}$$

$$\theta = \tan^{-1}\left( \frac{\|\vec{n}_{proj} \times \vec{V}_\theta\|}{\vec{n}_{proj} \cdot \vec{V}_\theta} \right) \quad \text{(Eq. 43)}$$

The yaw angle (φ) is computed as follows:

$$\vec{V}_\varphi = \begin{bmatrix} n_{plane,x} \\ 0 \\ n_{plane,z} \end{bmatrix} \quad \text{(Eq. 44)}$$

$$\theta = \tan^{-1}\left( \frac{\|\vec{n}_{proj} \times \vec{V}_\varphi\|}{\vec{n}_{proj} \cdot \vec{V}_\varphi} \right) \quad \text{(Eq. 45)}$$

Once the pitch and yaw offset angles are computed, the angles can be provided (844) to an application that can use these offset angles to correct the keystone distortion.

Realization of the Method in a Projector/Camera Pair

The inventors have demonstrated the disclosed capability by interfacing a camera with a projector and optimizing the method for embedded software. A camera was selected and attached to a projector. The selected camera has an output format 8 bit YUV 422 and outputs the captured images at 30 frames per second. The camera output needs to be captured and processed within an IC on the projector or an external processor (or FPGA) needs to capture and process the image. For the latter case, the synchronization between IC and external processor becomes a complex situation and increases the cost of the solution. The approach to interface the camera directly to an ASIC or other IC, as proposed by this disclosure, is the most economical and simple solution. The ASIC used in the present application has an input port that can accept 30 bit data (10 bit A, B, C channels). Additionally, the ASIC is designed to process RGB444 or YUV422 data on ABC channels. The camera has 8 bit YUV422 on a single channel. The innovative approach disclosed herein is to interface the 8 bit output from the camera to one of the A, B or C channels. The ASIC is configured to treat the source as RGB. Data will pass through the ASIC without any modification. Frame data will be stored in internal memory for frame rate conversion purposes. At this stage, embedded software takes control. If the camera output is connected to the A channel, then, the data written to memory will be 8 bit Y (from channel A), 0 (from channel B) and 0 (from channel C), 8 bit U (from channel A), 0 (from channel B) and 0 (from channel C), 8 bit Y (from channel A), 0 (from channel B) and 0 (from channel C), 8 bit V (from channel A), 0 (from channel B) and 0 (from channel C) . . . . That is, 0xY1, 0x00, 0x00, 0xU1, 0x00, 0x00, 0xY2, 0x00, 0x00, 0xV2, 0x00, 0x00, 0xY3, 0x00, 0x00, 0xU3, 0x00, 0x00, 0xY4, 0x00, 0x00, 0xV4, 0x00, 0x00 . . . . Embedded software will process the bytes that are needed. To process only the luminance part, only Y components will be selected (by skipping next 6 bytes). In this way, data from the camera is transferred to the ASIC internal memory in less than 0.5 second (i.e., 1/30).

The second part of the demonstration was to optimize the method into an embedded environment. There are two parts to this process:

i. Image data management.
   ii. Achieving acceptable execution performance.

As described in the previous section, image data is directly written to internal memory of the ASIC. The processor can access image data from internal memory sequentially to calculate centroids in order to utilize L1/L2 caches available in the ASIC.

Automatic two-dimensional keystone correction operation involves the following elements:

1. Displaying a Gaussian pattern from the projector;
   2. Capturing the image as seen by the camera;
   3. Processing the image data to calculate keystone angles; and
   4. Applying the keystone angles to a keystone correction ASIC.

To achieve acceptable execution performance of the whole process, delays are minimized between displaying Gaussian pattern and setting up the camera to capture the image. Gaussian pattern is stored as SPLASH screen. This pattern is displayed on the screen and the display is frozen. At this time, camera output is enabled as input to the ASIC and the camera transfers the Gaussian pattern images to the ASIC. Embedded software separates luminance values from chrominance and saves luminance values for further processing. Once the projection screen's pitch and yaw offset angles are determined, they are used by the angle-based user model and keystone distortion is corrected.

Figure 16:
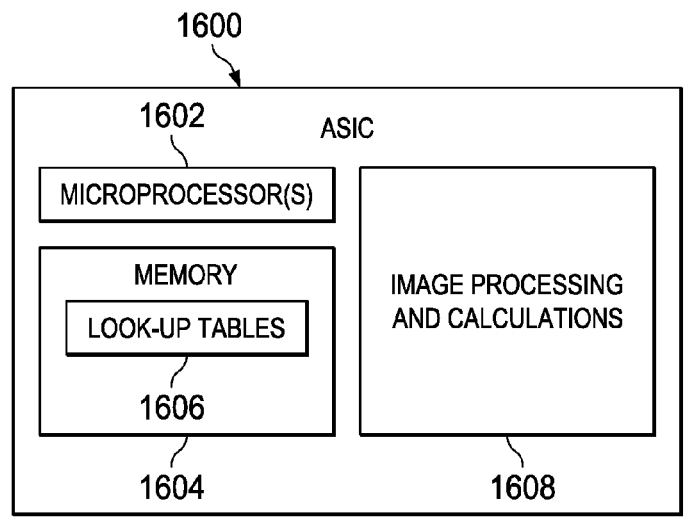
FIG. 16 depicts a block diagram of an IC that can be used to determine the pitch and yaw offset angles according to an embodiment of the disclosure.

Referring now to FIG. 16, a high-level diagram of an IC 1600 is shown according to an embodiment of the disclosure. IC 1600 contains one or more Microprocessors 1602 and a Memory 1604, in which the LUTs described above are stored. Memory 1604 can include Read-Only-Memory (ROM), Random Access Memory (RAM), Electrically Erasable Programmable Read-Only Memory (EEPROM), flash memory, etc. IC 1600 also includes an Image Processing and Calculations module 1608. Image Processing and Calculations module 1608 is designed to perform the methods of determining the pitch and yaw offset angles as disclosed herein. IC 1600 may be an application specific integrated circuit (ASIC), a system-on-chip (SoC) circuit, a field-programmable gate array (FPGA), or the like.

Figure 17:
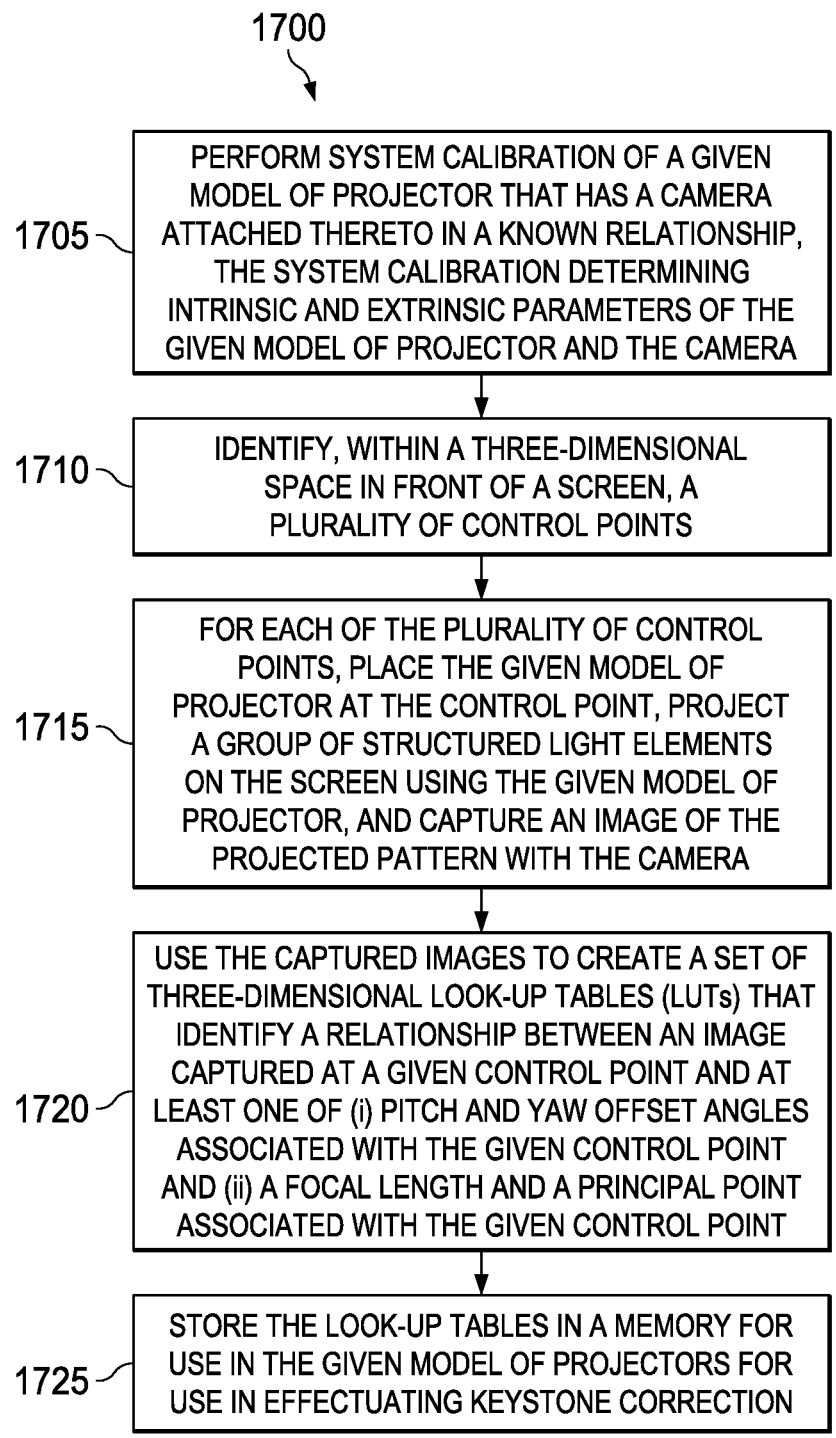
FIG. 17 depicts a flowchart of a method for enabling determination of a pitch offset angle and a yaw offset angle between a given model of projector and a screen according to an embodiment of the disclosure.

FIG. 17 depicts a flowchart of a method 1700 for facilitating keystone correction in a projector. Method 1700 begins by performing (1705) system calibration of a given model of projector that has a camera attached thereto in a known relationship the system calibration determining intrinsic and extrinsic parameters of each of the given model of projector and the camera. The method next identifies (1710) a plurality of control points within a three-dimensional space in front of a screen. For each of the plurality of control points, the method places (1715) the projector at the control point, projects a group of structured light elements on the screen using the projector, and captures an image of the projected pattern with the camera. The captured images are used (1720) to create a set of three-dimensional look-up tables (LUTs) that identify a relationship between an image captured at a given control point and at least one of (i) pitch and yaw offset angles associated with the given control point and (ii) a focal length and a principal point associated with the given control point. The LUTs are then stored (1725) in a memory for use in the given model of projectors for effectuating keystone correction.

Figure 18:
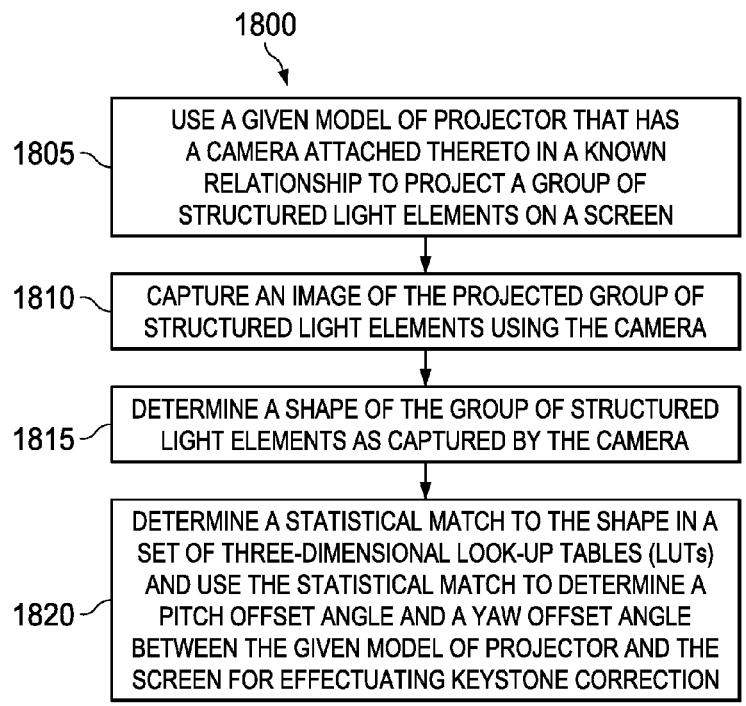
FIG. 18 depicts a flowchart of a method for determining a pitch offset angle and a yaw offset angle between a given model of projector and a screen according to an embodiment of the disclosure.

FIG. 18 depicts a flowchart of a method 1800 for effecting keystone correction on a projector. The method begins by using (1805) a given model of projector that has a camera attached thereto in a know relationship to project a group of structured light elements on a screen. An image of the projected group of structured light elements is captured (1810) using the camera. The method determines (1815) the shape of the group of structured light elements as captured by the camera. Finally, the method determines (1820) a statistical match to the shape in a set of three-dimensional look-up tables (LUTs) and uses the statistical match to determine a pitch offset angle and a yaw offset angle between the projector and the screen for effectuating keystone correction.

Figure 19:
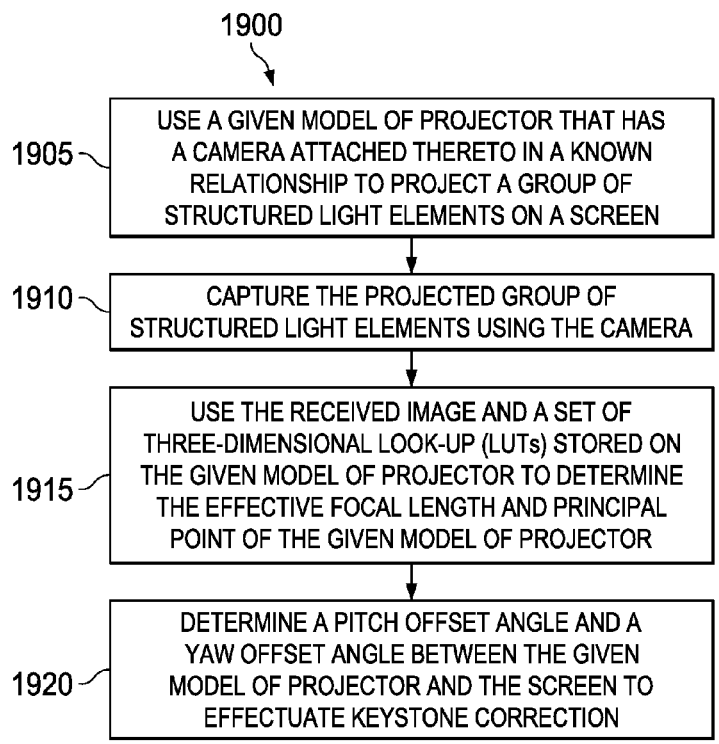
FIG. 19 depicts a flowchart of a method for determining a pitch offset angle and a yaw offset angle between a given model of projector and a screen according to an embodiment of the disclosure.

FIG. 19 depicts a flowchart of a method 1900 for effecting keystone correction on a projector. The method begins by using (1905) a given model of projector that has a camera attached thereto in a known relationship to project a group of structured light elements on a screen. An image of the projected group of structured light elements is captured (1910) using the camera. The method then uses (1915) the received image and a set of three-dimensional look-up tables (LUTs) stored on the given model of projector to determine the effective focal length and principal point of the projector. The method determines (1920) a pitch offset angle and a yaw offset angle between the given model of projector and the screen to effectuate keystone correction.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for facilitating keystone correction in a projector, comprising:
    performing system calibration of a given model of projector that has a camera attached thereto in a known relationship, the system calibration determining intrinsic and extrinsic parameters of the given model of projector and the camera;
    identifying, within a three-dimensional space in front of a screen, a plurality of control points, wherein the three-dimensional space defines a throw range of the given model of projector and further defines a maximum pitch offset and a maximum yaw offset of the given model of projector from the plane of the screen;
    for each of the plurality of control points, placing the given model of projector at the control point, projecting a group of structured light elements on the screen using the given model of projector, and capturing an image of the projected pattern with the camera;
    using the captured images to create a plurality of three-dimensional look-up tables (LUTs) that identify a relationship between an image captured at a given control point and at least one of (i) pitch and yaw offset angles associated with the given control point and (ii) a focal length and a principal point associated with the given control point; and
    storing the LUTs in a memory in the given model of projectors for use in effectuating keystone correction.

2. The method as recited in claim 1 further comprising determining the internal and external characteristics of the given model of projector and the camera from the captured images.

3. The method as recited in claim 2 wherein the internal and external characteristics of the given model of projector and the camera are determined for every position of a zoom control knob.

4. The method as recited in claim 2 wherein at a first control point at each of the plurality of distances from the screen, the group of structured light elements is projected and captured both with a zoom knob in a zoomedout position and with the zoom knob in a zoomed-in position.

5. The method as recited in claim 2 wherein the plurality of control points identified in the three-dimensional space comprises an array of control points at each of a plurality of distances from the screen.

6. The method as recited in claim 2 further comprising for each of the plurality of control points, determining a size of a camera-captured quadrilateral formed of known points in the projected structured light elements and storing the size in the LUTs.

7. A method for effecting keystone correction on a projector, comprising:

using a given model of projector that has a camera attached thereto in a known relationship to project a group of structured light elements on a screen;

capturing an image of the projected group of structured light elements using the camera;

determining a shape of the group of structured light elements as captured by the camera, wherein determining the shape comprises computing a vector array that defines the shape and size of a camera-captured quadrilateral formed of known points in the projected structured light elements; and determining a statistical match to the shape in a plurality of three-dimensional look-up tables (LUTs) and using the statistical match to determine a pitch offset angle and a yaw offset angle between the given model of projector and the screen for effectuating keystone correction, wherein the LUTs are stored on the given model of projector, and wherein determining the statistical match comprises accessing the LUT to select a first element in a first slice and a second element in a second slice, the first element and the second element having a minimum possible difference from the vector array.

8. The method as recited in claim 7 wherein using the statistical match to determine the pitch offset angle and the yaw offset angle further comprises:

calculating respective weights reflecting respective relative distances between the given model of projector and the first and the second slices;

retrieving pitch and yaw offset angles for each of the first element and the second element; and interpolating the pitch and the yaw offset angles of the given model of projector using the retrieved pitch and yaw offset angles for the first element, the second element, and the respective weights.

9. The method as recited in claim 8 further comprising providing the pitch offset angle and the yaw offset angle to an integrated circuit that performs keystone correction of an image projected by the given model of projector based on the offset angles.

10. An integrated circuit (IC) for effecting keystone correction on a projector, the IC comprising circuitry to perform a method comprising:

using a given model of projector having a camera attached thereto in a known relationship to project a group of structured light elements on a screen;

capturing an image of the projected group of structured light elements using the camera;

determining a shape of the group of structured light elements as captured by the camera, wherein determining the shape comprises computing a vector array that defines the shape and size of a camera-captured quadrilateral formed of known points in the projected structured light elements; and determining a statistical match to the shape in a plurality of three-dimensional look-up tables (LUTs) and using the statistical match to determine a pitch offset angle and a yaw offset angle between the given model of projector and the screen to effectuate keystone correction, wherein the LUTs are stored on the given model of projector, and wherein determining the statistical match comprises accessing the LUT to select a first element in a first slice and a second element in a second slice, the first element and the second element having a minimum possible difference from the vector array.

11. The IC as recited in claim 10 wherein the circuitry to perform the method comprises a memory, a microprocessor and the LUTs.

* * * * *